US008132060B2

(12) United States Patent
Wörner et al.

(10) Patent No.: US 8,132,060 B2
(45) Date of Patent: Mar. 6, 2012

(54) COMPREHENSIVE APPLICATION PROGRAMMING INTERFACES FOR HANDLING LOGICAL VOLUME MANAGER

(75) Inventors: Thomas Klaus Wörner, Tübingen (DE); Michael David Wysochanski, Raleigh, NC (US); Alasdair G. Kergon, Reading (GB)

(73) Assignee: Red Hat, Inc., Raleigh, NC (US)

( * ) Notice: Subject to any disclaimer, the term of this patent is extended or adjusted under 35 U.S.C. 154(b) by 149 days.

(21) Appl. No.: 12/626,344

(22) Filed: Nov. 25, 2009

(65) Prior Publication Data

US 2011/0126061 A1 May 26, 2011

(51) Int. Cl.
*G06F 11/00* (2006.01)

(52) U.S. Cl. ........................................ 714/57; 714/38.1

(58) Field of Classification Search .................... 714/57, 714/38.1

See application file for complete search history.

(56) References Cited

U.S. PATENT DOCUMENTS 7,860,986 B1 * 12/2010 Blumenau et al. ............ 709/229
2004/0080558 A1 * 4/2004 Blumenau et al. .............. 347/19
2007/0033281 A1 * 2/2007 Hwang et al. ................. 709/224
2007/0050591 A1 * 3/2007 Boyd et al. .................... 711/171
2007/0276916 A1 * 11/2007 McLoughlin et al. ........ 709/208
2008/0098184 A1 * 4/2008 Huras et al. ................... 711/154
2009/0063508 A1 * 3/2009 Yamato et al. .................. 707/10
2010/0180276 A1 * 7/2010 Jiva .................................. 718/1

OTHER PUBLICATIONS

"Logical Volume Manager (Linux)", accessed at: http://en.wikipedia.org/wiki/Logical_Volume_Manager_(Linux) on Jan. 13, 2010, last updated: Dec. 23, 2009, 3 pages.

* cited by examiner

*Primary Examiner* — Scott Baderman
*Assistant Examiner* — Chae Ko
(74) *Attorney, Agent, or Firm* — Lowenstein Sandler PC

(57) ABSTRACT

Some embodiments of a system and a method to provide comprehensive application programming interfaces to a logical volume manager have been presented. For instance, a processing device running on a server may provide a library having a set of application programming interfaces to interface an application and a logical volume manager (LVM). In response to an error occurring while running the application in operation with the LVM, the processing device may return an error string in a natural language, a piece of programming code associated with the error, and an error code associated with the error using one or more of the set of application programming interfaces.

15 Claims, 3 Drawing Sheets

COMPREHENSIVE APPLICATION PROGRAMMING INTERFACES FOR HANDLING LOGICAL VOLUME MANAGER

TECHNICAL FIELD

Embodiments of the present invention relate to logical volume manager (LVM), and more specifically to providing application programming interfaces (APIs) to handle LVM.

BACKGROUND

Currently, many computing systems provide a mass storage device management module usable by applications in general. The conventional mass storage device management module typically provides functions or APIs to applications to allow the applications to use the underlying mass storage devices, such as a disk drive, in the computing systems and to access data (such as objects) stored in the underlying mass storage devices.

When an error occurs in an application, the functions and/or the APIs of the conventional mass storage device management module typically returns a simple, generic error string without much detail about the error occurred. This is because the conventional mass storage device management module in general lacks full error reporting capability. As a result, it is difficult to debug an error that occurs because of misuse of the functions and/or APIs of the conventional mass storage device management module.

BRIEF DESCRIPTION OF THE DRAWINGS

The present invention is illustrated by way of example, and not by way of limitation, in the figures of the accompanying drawings and in which.

DETAILED DESCRIPTION

Figure 1:
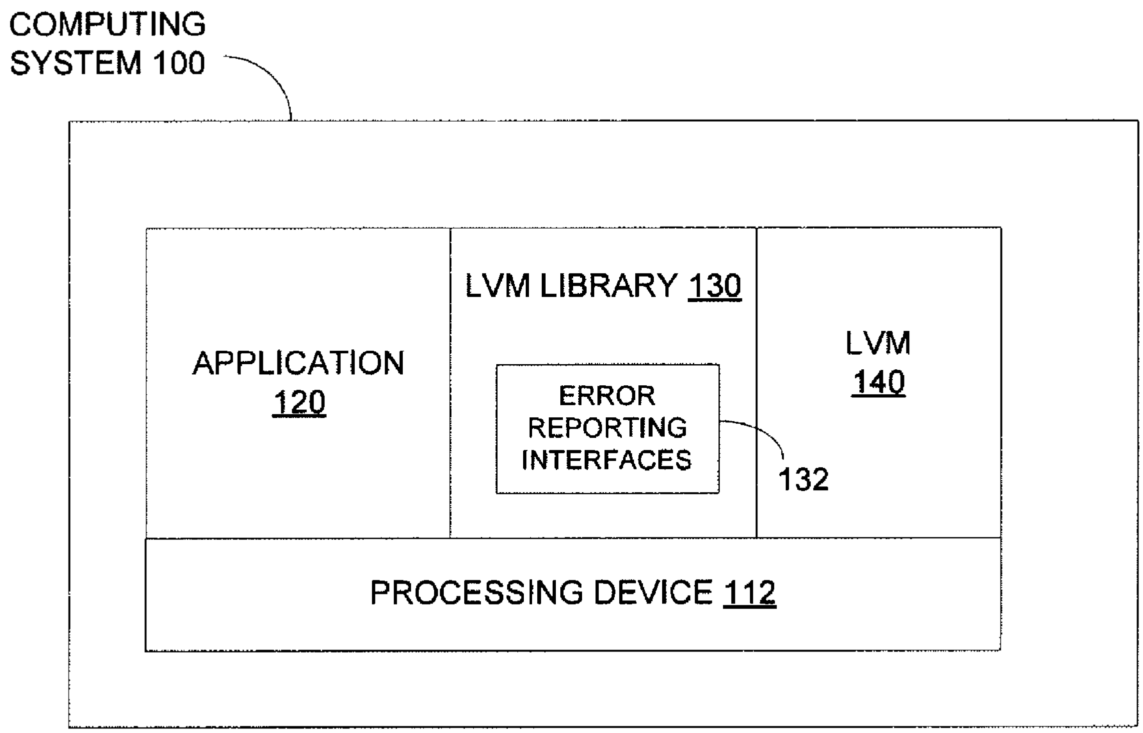
FIG. 1 illustrates one embodiment of software architecture executable in a computing system.

Described herein are some embodiments of a method, an apparatus, and a system to provide comprehensive application programming interfaces (APIs) for handling logical volume manager (LVM). A LVM as used herein generally refers to a mass storage device managing module in a computing system. The LVM abstracts physical storage into logical storage entities with specific properties allowing more productive storage use. Examples may include mirroring of physical storage, spare copies (such as snapshots) of physical storage, etc. In one embodiment, a processing device running on a server may provide a library having a set of application programming interfaces to interface an application and a LVM. In response to an error occurring while running the application in operation with the LVM, the processing device may return an error string in a natural language, a piece of programming code associated with the error, and an error code associated with the error using one or more of the set of application programming interfaces. More details of some embodiments of the comprehensive APIs for handling LVM are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing" or "returning" or "displaying" or "writing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 3:
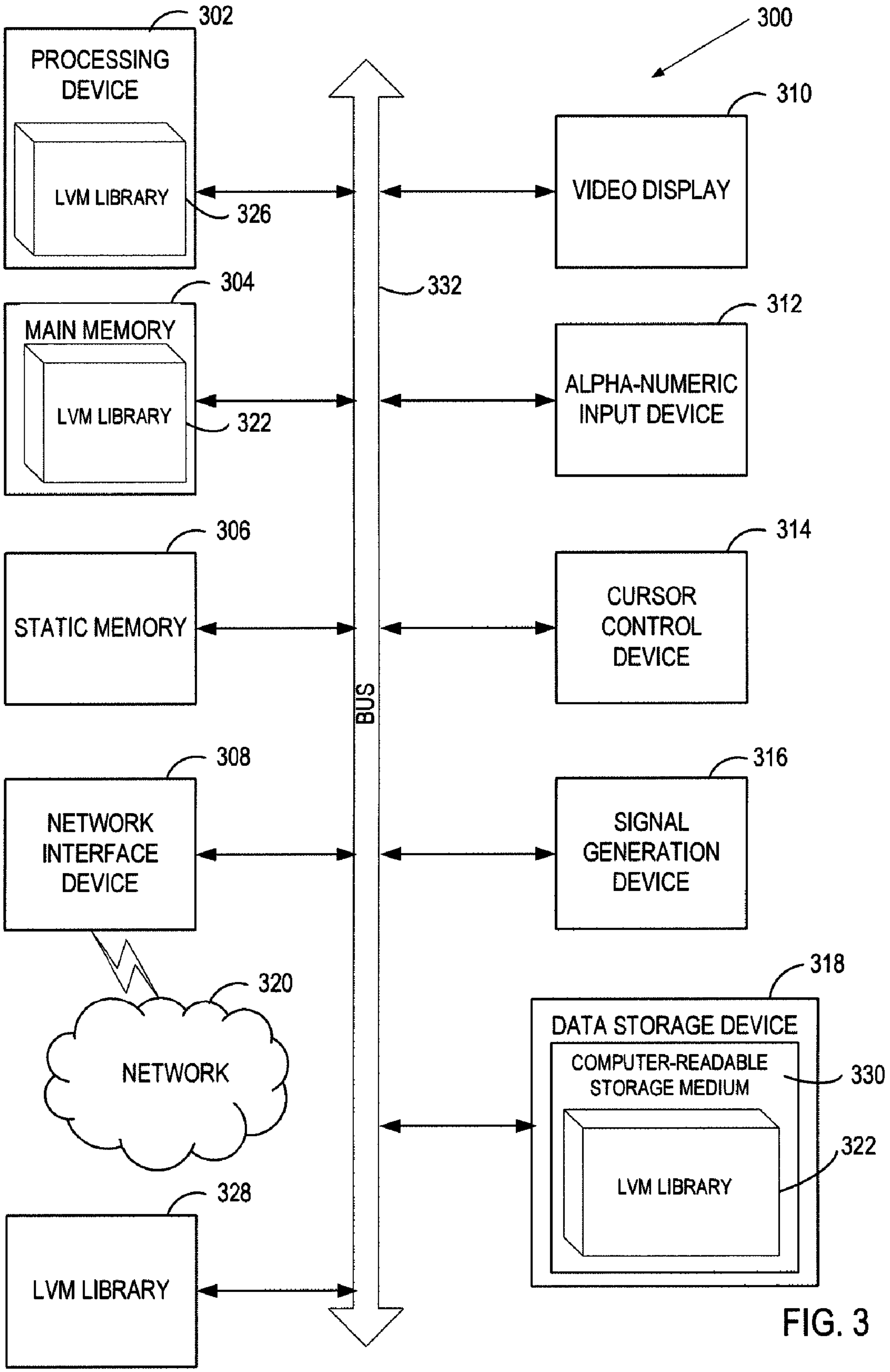
FIG. 3 illustrates a block diagram of an exemplary computer system.

FIG. 1 illustrates one embodiment of software architecture executable in a computing system. The computing system 100 includes a processing device 112. The computing system 100 may be implemented using a server, a personal computer (PC), a laptop computer, etc. Details of one embodiment of the computing system 100 are illustrated in FIG. 3. Various modules of the software architecture may be executed by the processing device 112.

In some embodiments, the software architecture includes a LVM 140, a LVM library 130, and an application 120. Note that there may be multiple applications running on the processing device 112 in some embodiments. The LVM library 130 includes a set of APIs usable by the LVM 140 to interface with the application 120. Some exemplary APIs are discussed further in details below.

In some embodiments, the LVM library 130 is designed around three types of basic LVM objects, namely, physical volume (PV), volume group (VG), and logical volume (LV). A VG object can be either a read-only object or a read-write object depending on the mode it has been returned by a function. Create functions return a read-write object, but open functions have the argument mode to define if the object can be modified or not. A LV object is bound to a VG and has the same mode of the VG. Changes to the LV object may be written to disk when the VG gets committed to disk. Likewise, a PV object is bound to a VG, and has the same mode of the VG. Changes to the PV object may be written to disk when the VG gets committed to disk.

The LVM library 130 may provide functions to list the objects in a system, get and set objects properties (such as names, identifiers, and sizes), as well as create and/or remove objects and perform more complex operations and transformations. Each object instance is represented by a handle, and handles are passed to and from the functions to perform the operations. As used herein, a handle generally refers to an abstract reference used to refer to an object or a block of memory.

In some embodiments, a central object in the LVM library 130 is a VG, represented by a VG handle, vg_t. Performing an operation on a PV or LV object first requires obtaining a VG handle. Once the vg_t has been obtained, it can be used to enumerate the handles of PV and LV (represented as pv_t and lv_t, respectively) within that vg_t. Attributes of these objects can then be queried. A VG handle may be obtained with read or write permission. Any attempt to change a property of a pv_t, vg_t, or lv_t without obtaining write permission on the vg_t may fail.

The application 120 first opening a VG read-only, then later wanting to change a property of an object must first close the VG and re-open with write permission. In some embodiments, the LVM library 130 provides no mechanism to determine whether the VG has changed on-disk in between these operations. This is the responsibility of the application 120. One way the application 120 can ensure the VG has not changed is to save the "vg_seqno" field after opening the VG with read permission. If the application 120 later needs to modify the VG, it can close the VG and re-open with write permission. The application 120 may then check whether the original "vg_seqno" obtained with read permission matches the new one obtained with write permission.

In some embodiments, the LVM library 130 provides a LVM handle as the base handle for opening and creating objects, such as VGs and LVs. In addition, the LVM handle provides a context for error handling information, saving any error number and error message that any function may generate. Details of one embodiment of the creation of a LVM handle are discussed below.

Once all LVM operations have been completed, lvm_quit from the LVM library 130 may be used to release the LVM handle and any associated resources. A valid LVM handle is returned if there is no error; or NULL is returned if there has been an error, such as a memory allocation problem. To check if an error has occurred, the application 120 may use the lvm_error function from the LVM library 130. A LVM handle allocated with lvm_init may be destroyed after all LVM operations are complete or after an unrecoverable error. Destroying the LVM handle frees the memory and other resources associated with the handle. Once destroyed, the LVM handle cannot be used subsequently.

In some embodiments, the LVM library 130 provides several error reporting functions to better assist users to debug when errors occur. For instance, the LVM library 130 may provide a function lvm_errno, which returns an error number value associated with the last LVM error. The error number may be used to determine the details of any failure of the last call. Although basic success or fail is returned by every function, either by returning a 0 or −1, alternatively, a non-NULL or a NULL value, lvm_errno may be used to get a more specific error code associated with the failure. In this way, lvm_errno may be used after every function call, even after a "get" function call that simply returns a value.

In some embodiments, the LVM library 130 provides a function lvm_errmsg to return stored error message describing the last LVM error. This function may be used in conjunction with lvm_errno to obtain more specific error information for a function that is known to have failed. The stored error message may be returned in the form of an error string in a natural language. A natural language as used herein generally refers to a language written or spoken by humans for general-purpose communication, as opposed to constructs, such as computer-programming languages, machine-readable or machine-executable languages, or the languages used in the study of formal logic, such as mathematical logic. Some examples of a natural language include English, German, French, etc.

Note that the LVM library 130 acts as an object model interface between the application 120 and the LVM 140. The error reporting interfaces 132, which include one or more error reporting interfaces or error reporting functions discussed above, provide full error reporting to users of the application 120. In some embodiments, the error reporting interfaces 132 are implemented by adding error conditions in code of the LVM library 130. As such, the error reporting interfaces 132 is integrated into the LVM library 130 and can be used on the library level.

Figure 2:
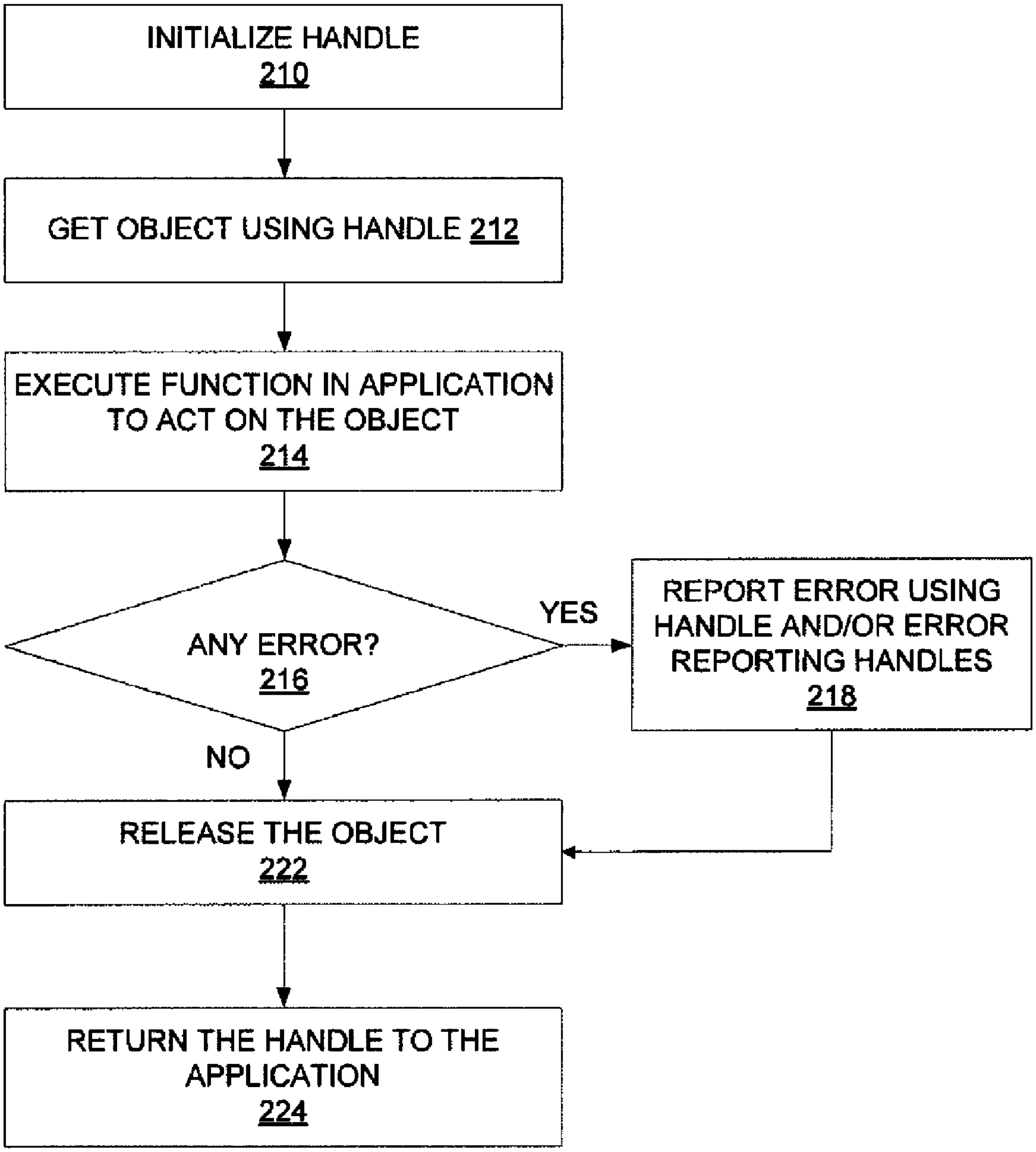
FIG. 2 illustrates a flow diagram of one embodiment of a method to use APIs to enhance error reporting for LVM.

FIG. 2 illustrates a flow diagram of one embodiment of a method to use APIs to enhance error reporting for LVM. The method may be performed by processing logic that may comprise hardware (e.g., circuitry, dedicated logic, programmable logic, microcode, etc.), software (such as instructions run on a processing device), firmware, or a combination thereof. For instance, the computing system 300 illustrated in FIG. 3 may perform at least part of the method in some embodiments.

Initially, processing logic initializes a handle for a logical object (processing block 210). Then processing logic gets the logical object for an application using the handle (processing block 212). Processing logic may execute a function in the application to act on the logical object (processing block 214). After executing the function, processing logic checks to determine if there has been any error resulted from execution of the function (processing block 216). For instance, the function may return "0" if there is no error, or "−1" if there is an error. If there is an error, processing logic may report the error using the handle and/or other error reporting handles (processing block 218). In some embodiments, processing logic may use multiple error reporting handles to obtain an error code, an error string in a natural language, and/or a section of programming code of the function associated with the error. Furthermore, processing logic may display the error code, the error string, and the section of programming code on a display device (e.g., a monitor) using a user interface (e.g., a graphical user interface, a command line interface, etc.). Alternatively, processing logic may write the error code, the error string, and the section of programming code into a file, which may be stored in a computer-readable storage device to be accessed later, or be transmitted to another computing system.

If there is no error, processing logic may release the object from the handle (processing block 222). Processing logic may return the handle to the application (processing block 224).

FIG. 3 illustrates a diagrammatic representation of a machine in the exemplary form of a computer system 300 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing device 302, a main memory 304 (e.g., read-only memory (ROM), flash memory, dynamic random access memory (DRAM) such as synchronous DRAM (SDRAM), a static memory 306 (e.g., flash memory, static random access memory (SRAM), etc.), and a data storage device 318, which communicate with each other via a bus 332.

Processing device 302 represents one or more general-purpose processing devices such as a microprocessing device, a central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 302 may also be one or more special-purpose processing devices such as an application specific integrated circuit (ASIC), a field programmable gate array (FPGA), a digital signal processing device (DSP), network processing device, or the like. The processing device 302 is configured to execute functions or APIs in the LVM library 326 for performing the operations and steps discussed herein.

The computer system 300 may further include a network interface device 308. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

The data storage device 318 may include a computer-accessible storage medium 330 (also known as a computer-readable storage medium) on which is stored one or more sets of instructions (e.g., LVM library 322) embodying any one or more of the methodologies or functions described herein. The LVM library 322 may also reside, completely or at least partially, within the main memory 304 and/or within the processing device 302 during execution thereof by the computer system 300, the main memory 304 and the processing device 302 also constituting computer-accessible storage media. The LVM library 322 may further be transmitted or received over a network 320 via the network interface device 308.

While the computer-readable storage medium 330 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The LVM library 328, components and other features described herein (for example, in relation to FIG. 1) can be implemented as discrete hardware components or integrated into the functionalities of hardware components, such as ASICS, FPGAs, DSPs, or similar devices. In addition, the LVM library 328 can be implemented as firmware or functional circuitries within hardware devices. Further, the LVM library 328 can be implemented in any combination of hardware devices and software components.

Thus, some embodiments of the comprehensive APIs for handling LVM have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:

providing, by a processing device running on a server, a library having a set of application programming interfaces to interface an application and a logical volume manager (LVM), wherein the set of application programming interfaces comprises a set of error reporting interfaces that are configured to report an error using a handle corresponding to an object and a plurality of error reporting handles;

initializing a handle for a logical object;

retrieving the logical object for the application using the handle;

executing a function in the application to act on the logical object;

after said executing, determining if an error occurred resulting from said executing;

if there is an error, reporting the error using the handle and the plurality of error reporting handles, wherein said reporting comprises:

reporting the error using the handle;

reporting an error code associated with the error using one of the plurality of error reporting handles;

reporting an error string in a natural language describing the error using another one of the plurality of error reporting handles; and reporting a section of programming code of the function associated with the error using another one of the plurality of error reporting handles; and if there is no error, releasing the logical object from the handle and returning the handle to the application.

2. The method of claim 1, wherein said reporting comprises displaying, by a display device coupled to the server, the error string, the piece of programming code associated with the error, and the error code associated with the error on a user interface.

3. The method of claim 1, wherein said reporting comprises writing, by the processing device, the error string, the piece of programming code associated with the error, and the error code associated with the error into a file.

4. The method of claim 1, wherein the set of application programming interfaces includes a function to initialize handles for logical volume objects, the handles are usable by the application to create and open the logical volume objects.

5. The method of claim 1, wherein the error string, the piece of programming code associated with the error, and the error code associated with the error returned are available to the LVM.

6. An apparatus comprising:

a computer-readable storage device to store a library having a set of application programming interfaces to interface an application and a logical volume manager (LVM), wherein the set of application programming interfaces comprises a set of error reporting interfaces that are configured to report an error using a handle corresponding to an object and a plurality of error reporting handles; and a processing device to execute the application in operation with the LVM, and wherein the processing device is to:

initialize a handle for a logical object;

retrieve the logical object for the application using the handle;

execute a function in the application to act on the logical object;

determine if an error occurred resulting from executing the function;

if there is an error, report the error using the handle and the plurality of error reporting handles, wherein one of the plurality of error reporting handles comprises an error code associated with the error, wherein another one of the plurality of error reporting handles comprises an error string in a natural language describing the error, and wherein another one of the plurality of error reporting handles comprises a section of programming code of the function associated with the error; and if there is no error, release the logical object from the handle and return the handle to the application.

7. The apparatus of claim 6, further comprising a display device to display the error string, the piece of programming code associated with the error, and the error code associated with the error on a user interface.

8. The apparatus of claim 6, wherein the processing device writes the error string, the piece of programming code associated with the error, and the error code associated with the error into a file.

9. The apparatus of claim 6, wherein the set of application programming interfaces includes a function to initialize handles for logical volume objects, the handles are usable by the application to create and open the logical volume objects.

10. The apparatus of claim 6, wherein the error string, the piece of programming code associated with the error, and the error code associated with the error returned are available to the LVM.

11. A non-transitory computer-readable storage medium embodying instructions that, when executed by a processing device, will cause the processing device to perform a method comprising:

providing, by a processing device running on a server, a library having a set of application programming interfaces to interface an application and a logical volume manager (LVM), wherein the set of application programming interfaces comprises a set of error reporting interfaces that are configured to report an error using a handle corresponding to an object and a plurality of error reporting handles;

initializing a handle for a logical object;

retrieving the logical object for the application using the handle;

executing a function in the application to act on the logical object;

after said executing, determining if an error occurred resulting from said executing;

if there is an error, reporting the error using the handle and the plurality of error reporting handles, wherein said reporting comprises:

reporting the error using the handle;

reporting an error code associated with the error using one of the plurality of error reporting handles;

reporting an error string in a natural language describing the error using another one of the plurality of error reporting handles; and reporting a section of programming code of the function associated with the error using another one of the plurality of error reporting handles; and if there is no error, releasing the logical object from the handle and returning the handle to the application.

12. The computer-readable storage medium of claim 11, wherein said reporting comprises displaying, by a display device coupled to the server, the error string, the piece of programming code associated with the error, and the error code associated with the error on a user interface.

13. The computer-readable storage medium of claim 11, wherein said reporting comprises writing, by the processing device, the error string, the piece of programming code associated with the error, and the error code associated with the error into a file.

14. The computer-readable storage medium of claim 11, wherein the set of application programming interfaces includes a function to initialize handles for logical volume objects, the handles are usable by the application to create and open the logical volume objects.

15. The computer-readable storage medium of claim 11, wherein the error string, the piece of programming code associated with the error, and the error code associated with the error returned are available to the LVM.

* * * * *